United States Patent [19]

Adams, Jr.

[11] Patent Number: 4,932,222
[45] Date of Patent: Jun. 12, 1990

[54] IN-LINE MILK COOLER

[76] Inventor: Thomas A. Adams, Jr., 2517 S. Niagara, Saginaw, Mich. 48602

[21] Appl. No.: 259,296

[22] Filed: Oct. 18, 1988

[51] Int. Cl.⁵ .............................................. F25D 17/02
[52] U.S. Cl. ....................................... 62/303; 62/434; 165/104.31
[58] Field of Search ................. 62/434, 435, 439, 430, 62/303; 165/104.31

[56] References Cited

U.S. PATENT DOCUMENTS

| | | | |
|---|---|---|---|
| 1,891,305 | 12/1932 | Fosberry | 62/434 X |
| 2,085,186 | 6/1937 | Eger | 62/434 X |
| 2,214,009 | 9/1940 | Boester, Jr. | 62/434 X |
| 2,246,999 | 6/1941 | Morrison | 62/434 X |
| 2,253,882 | 8/1941 | Achs | 62/434 X |
| 2,364,154 | 12/1944 | Markley, Jr. | 62/434 X |
| 2,583,982 | 1/1952 | Zwosta et al. | 62/303 X |
| 4,280,335 | 7/1981 | Perez et al. | 62/435 X |

Primary Examiner—William E. Tapolcai
Attorney, Agent, or Firm—John J. Swartz

[57] ABSTRACT

A milk cooler including a water tank having water therein and mechanism for cooling the water, a pipe system for transferring fresh milk to a storage tank, and mechanism for cooling the milk before it arrives at the storage tank including apparatus for passing the water over the pipe to extract heat from the pipe. The system contemplates a new and novel evaporator which is disposed in the water for cooling the water and a new and novel cooling chamber disposed above the cooling tank which receives water from the cooling tank to cool the milk.

11 Claims, 3 Drawing Sheets

IN-LINE MILK COOLER

BACKGROUND OF THE INVENTION

1. FIELD OF THE INVENTION

This invention relates to cooling apparatus and more particularly to in-line cooling apparatus for cooling liquids, such as fresh milk, as it is being delivered from the source, such as a cow to a storage tank.

2. DESCRIPTION OF PRIOR ART

In a typical dairy operation, the rapid cooling of milk is important to prevent an unacceptable level of bacteria. The milk emitted by a cow's udder is approximately 101°-102° F. It is important that this milk be cooled to 45° within two hours.

In a typical dairy operation, the milk is stored in a refrigerated bulk tank which includes a system for stirring the milk in the tank.

Butterfat content is an important factor in determining the price a farmer is paid for his milk. It has been found that improper cooling can result in the loss of butterfat. In a typical dairy operation, the milk from a subsequent milking is added to previously cooled milk and it is important that the temperature of the previously cooled milk not rise an appreciable amount. The temperature of the milk which is normally stored at 34°-40° should not increase above 50°.

To decrease the problems associated with the increase of temperature occasioned by the "second milking", it is desirable to precool the milk prior to being admitted to the bulk cooler. The precooling results in a blend temperature in the bulk cooler which is lower than it otherwise would be, therefore, the condensing unit of the bulk cooler operates less as in sufficiently reducing the blend temperature of the milk.

Accordingly, it is an object of the present invention to provide a new and novel in-line cooler which will cool liquid, such as milk, prior to being fed to a bulk storage tank.

It is another object of the present invention to provide a milk cooler for rapidly cooling milk before it is introduced to a bulk storage tank.

With increasing energy costs in the past few years, the efficiency of cooling units is important and any increase in efficiency of cooling represents a substantial increase in savings to the farmer. It is another object of the present invention to provide a cooler of the type described which will cool liquid such as milk more efficiently than has been done heretofore.

It has been found according to the present invention that a stream of water passed over a milk containing conduit can be so constructed as to extract a substantial amount of heat from the milk before it passes to the bulk tank. An important aspect of the success of such heat withdrawal lies in the mechanism for cooling the water.

It has been found that evaporators and radiators of the type which are conventionally air cooled or utilized to cool air have radiating fins thereon which are relatively close together and are not suitable for use in cooling water. The fins or plates must be sufficiently spaced to allow the water being cooled to easily pass therebetween, otherwise the water being cooled will tend to freeze.

It has been found that a sinuous or serpentine refrigerant carrying tubing, having heat conductive plates, in intimate engagement therewith but spaced a proper amount therefrom, are very effective in cooling the water provided that the plates are sufficiently separated to allow the water to be properly circulated therethrough. Moreover, the orientation and relative position of vertically disposed refrigerant carrying tube sections can affect the cooling efficiency. Accordingly, it is an object of the present invention to provide a cooler of the type described which includes new and novel mechanism for cooling the water which is utilized to cool the milk.

It is another object of the present invention to provide cooling apparatus of the type described including an evaporator which receives a refrigerant and includes a plurality of spaced apart, heat conductive plates in intimate engagement therewith and spaced apart a sufficient distance to receive cooling water which is directed therethrough.

It is another object of the present invention to provide a liquid cooler of the type described including an evaporator having a plurality of generally parallel, vertically spaced, heat transmitting fins thereon having a significant heat exchange surface area but being sufficiently spaced apart to allow the free flow of water therebetween.

It is another object of the present invention to provide a milk cooler which can be quickly, easily and efficiently sanitized.

Other objects and advantages of the present invention will become apparent to those of ordinary skill in the art as the description thereof proceeds.

SUMMARY OF THE INVENTION

In-line cooling apparatus for cooling liquids, such as milk, comprising: a cooler tank containing cooling fluid; mechanism for cooling the cooling fluid; a conduit for communicating a liquid to be cooled from a source to a storage tank; and mechanism for cooling the liquid in the conduit including apparatus for passing the cooling fluid over a portion of the conduit to extract heat therefrom.

BRIEF DESCRIPTION OF THE DRAWINGS

The invention may be more readily understood by referring to the accompanying drawings, in which:

FIG. 6 is an end elevational view of the evaporator only.

DESCRIPTION OF THE PREFERRED EMBODIMENT

Figure 1:
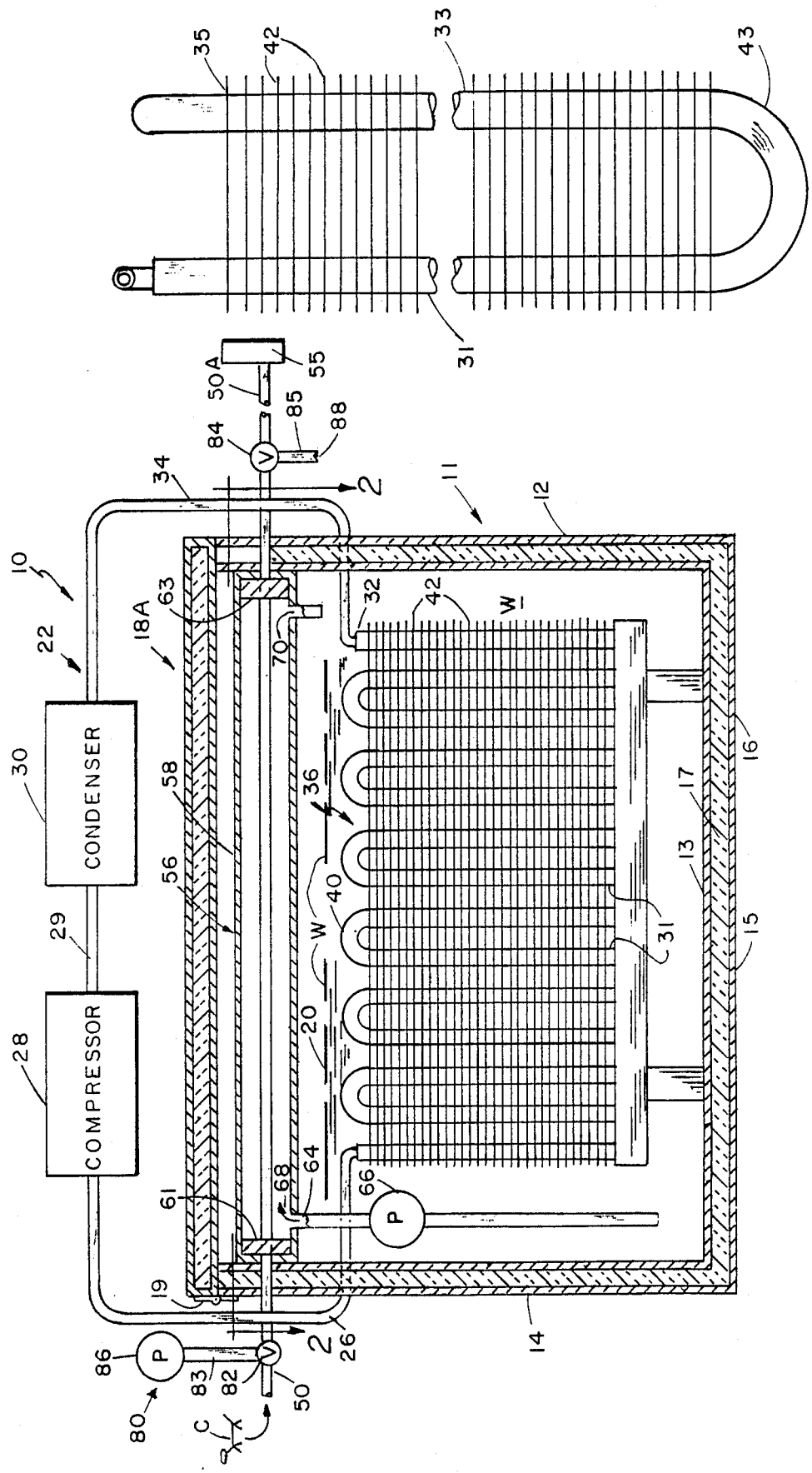
FIG. 1 is a sectional side elevational view illustrating the apparatus constructed according to the present invention.
Figure 2:
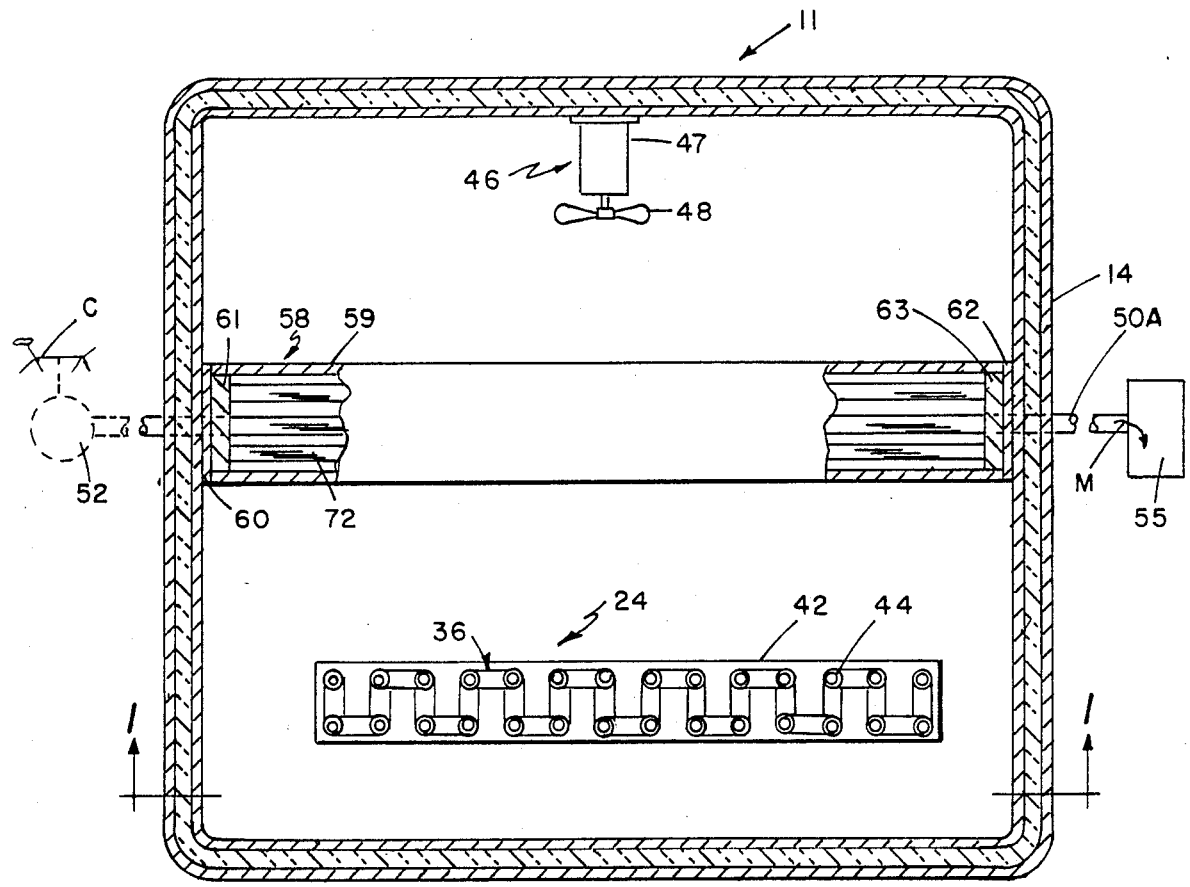
FIG. 2 is a top plan sectional view thereof, taken along the line 2—2 of FIG. 1.
Figure 3:
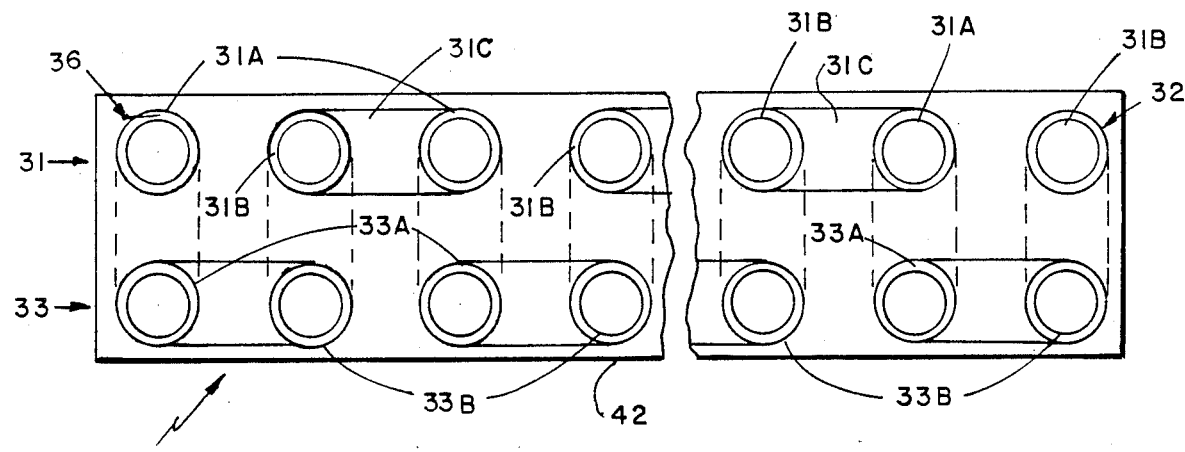
FIG. 3 is an enlarged top plan view of the evaporator only.
Figure 4:
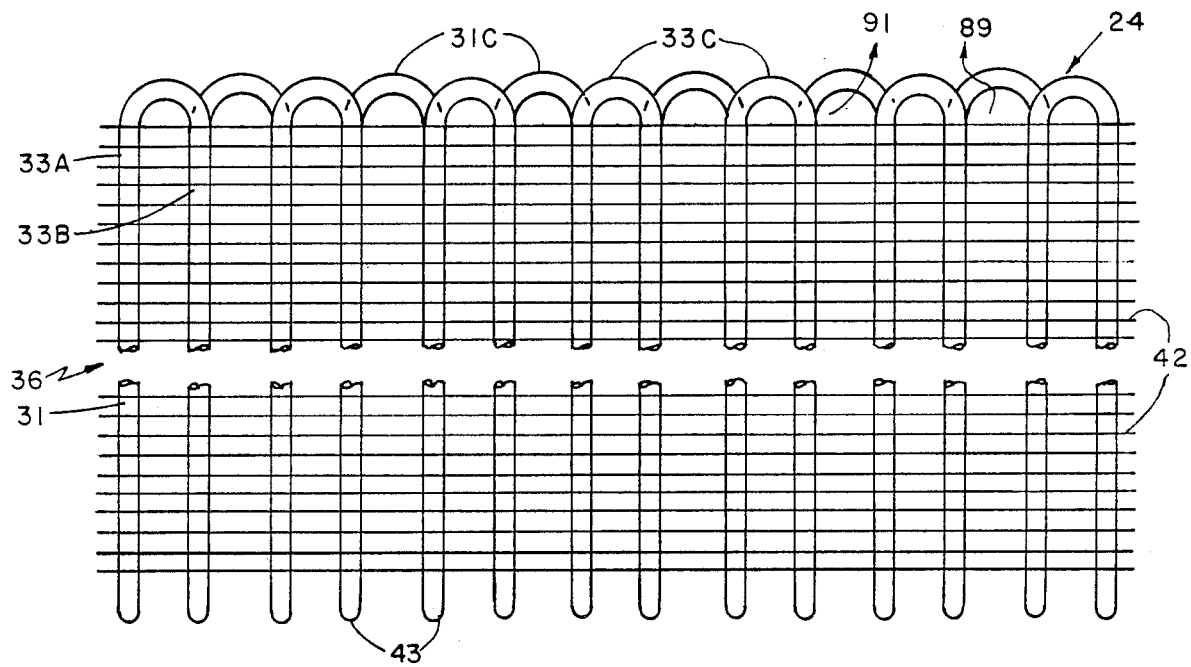
FIG. 4 is a bottom plan view thereof.
Figure 5:
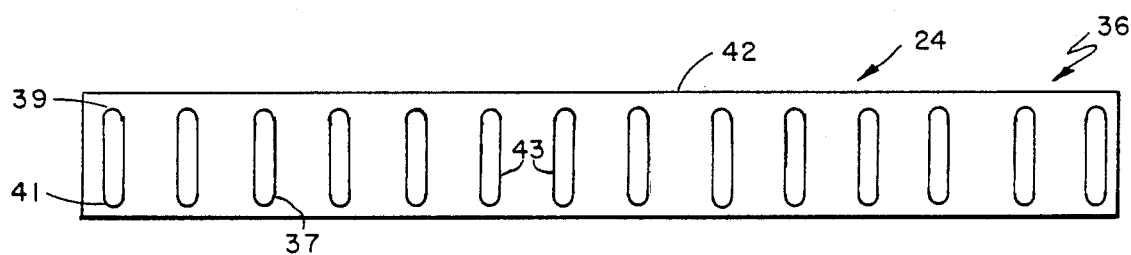
FIG. 5 is a side elevational view of the evaporator only.

Cooling apparatus constructed according to the present invention, generally designated 10, includes an insulated cooling tank, generally designated 11, having integral insulated side walls 12, end walls 14, and a bottom wall 16. An insulated cover 18A is hingedly connected to one of the end walls 14 via a hinge 19 as illustrated. The tank is filled with water W, which may be mixed with an antifreeze solution, to a level 20 as illustrated.

Each of the walls 12, 14, 16 and 18 includes inner and outer water impervious skins 13 and 15 sandwiching a layer 17 of heat insulation I therebetween.

Refrigerating apparatus, generally designed 22, is provided for cooling the water W and includes an evaporator, generally designated 24, disposed in the tank 10 below the level 20 of the water W. The refrigerating apparatus 22 also includes an outlet line 26 coupled to a compressor 28 which is coupled via line 29 to a condensor 30 which has its outlet connected to the inlet 32 of the evaporator via a line 34. If desired, the compressor and condensor can be mounted atop a portion of the tank lid 18a which can be split.

The evaporator 24 includes a continuous serpentine tubing, generally designated 36, including a plurality of rows 31, 33 of longitudinally aligned, alternate upstanding vertical tube sections, 31A, 31B and 33A and 33B respectively. The vertical evaporator tube sections 33A and 33B of row 33 are laterally aligned with tube sections 31A and 31B respectively of row 31. At their upper ends the vertical tube sections 31A and 33A are each coupled to an adjacent one of the tube sections 31B and 33B, respectively, via longitudinally extending U-shaped end tubular members 31C and 33C, respectively.

Each tube section 33A is coupled at its upper end 35 to the upper end of an adjacent tube section 33B via a U-shaped end tubular section 33C. Each tube section 31A is coupled at its upper end 37 to the upper end of an adjacent tube section 31B via a U-shaped tube section 31C.

It should be noted that the U-shaped sections 31A are longitudinally staggered relative to the U-shaped sections 33C to enhance the proper flow of water W circulated by an underwater pump-fan 46.

The lower end 39 of each tube section 31A is coupled to the lower end 41 of laterally each aligned tube section 33B via a transversely extending U-shaped tube section 43.

As illustrated in the drawings, the plurality of vertically spaced apart heat conductive plates 42 are mounted on the serpentine tubing 36 and includes a plurality of apertures 44 therein which are in intimate engagement with the vertical tube sections 31A, 31B, 33A and 33B. It is important that the spacing of the plates 42 be maintained at at least one-quarter inch intervals to allow the water W to circulate therethrough via a submergible pump 46 illustrated as having a motor 47 driving a water driving blade 48 which circulates the water W between the plates 42 and around the refrigerant tubes 36.

The refrigerating system 22 is filled with freon which is returned to the compressor via line 26 in a cool liquid stage at a temperature of approximately 32° -34° F. The compressor 28 comprises a conventional pump which builds the pressure and provides a semi-cool liquid which is heated substantially in the outlet tube 29.

The condensor 30 includes a typical set of coils and a fan (not shown) to cool the freon in its liquid stage and return it in a "solid liquid" form to a relatively small diameter tube 34. In the condensor 30, as the liquified freon reaches the enlarged diameter evaporator inlet 32, the refrigerant expands and vaporizes. The compressor and condensor may suitably be manufactured by Copeland Compressor, Model No. AAC042G identified by the Trademark Arco Aire, Model No. 9735 distributed by Snyder General Corporation, 9735 Landmark Parkway Drive, St. Louis, Mo. It is important that the compressor have sufficient capacity to pump the freon through the evaporator but not allowing the refrigerant to freeze. As the refrigerant passes through the evaporator, it extracts heat from the water W, thereby cooling the water W.

Milk to be cooled is transported via conduit 50 which receives the milk from an automatic milker, schematically designated 52, which is coupled to a cow C. The conduit 50 transports the milk to a bulk tank schematically designated 55.

A portion 54 of the milk conduit is mounted above the water W in the cooling tank 12 and is received in a cooling tube chamber 56 which comprises a hollow cylinder 58 closed at opposite ends via end caps 60 and 62 respectively. An inlet 64 in the sidewall 59 of cylinder 58 is coupled to a pump 66 which draws water W from the tank 12 and passes it into the tube 58 for passage downstream in the direction of the arrow 68 for discharge through an outlet 70 at the downstream end of the tube sidwall 59 for return to the tank 12.

The cooling tube chamber 56 internally mounts upstream and downstream hollow milk carrying, manifolds 61 and 63 coupled together via reduced diameter milk carrying tube sections 72. The upstream manifold 61 is coupled to milk carrying inlet conduit 50 and the downstream manifold 63 is coupled to a milk carrying conduit portion 50A which is transfers the cooled milk to the bulk tank 55, as represented by the arrow M.

The plurality of reduced diameter tube sections 72 provide an increased surface area for transmitting heat from the milk to the water represented by the arrow 68, flowing within cooling tube chamber 56.

In a conventional milk operation, the milk conducting tubes 50, 50A and 72 must be cleaned after each milking. It is important that the cooling unit 49 be disposed outside of the water W to facilitate cleaning of the tubes 50 and 54.

Cleaning apparatus, generally designated 80, is provided for cleaning the milk cooling lines 50, 50A and 72. The apparatus 80 includes valves 82 and 84, connected in the lines 50 and 50A respectively for selectively coupling, via conduits 83 and 85, the lines 50 and 50A to a pressurized cleaning fluid pump 86 and to a discharge outlet 88, respectively.

The cleaning fluid emitted by pump 86 must typically be maintained at a temperature of 70° F. to effectively clean the tubes 50, 50A and 72. When the cleaning valves 82 and 84 operate to couple the cleaning pump 86 into the system, the valves 82 and 84 concurrently decouple the milker 52 and bulk tank 55 to preclude transfer of cleaning solution thereto. If the lines 50, 50A and 72 were immersed in the water W, the cleaning solution would not allow the temperature of the cleaning solution to remain at at least 70° F.

THE OPERATION

When the farmer is prepared to milk a cow C, he will operate the refrigerating system 22 to cool the water W and will operate the submergible pump 46 to direct the water W in a path over the serpentine coil 36 and fins 42. As the milk passes downstream from the cow to the bulk tank 54, the pump 66 will be operated to force water W, in the direction of arrow 68, along the multiple sub-units cooling tubes 72 to cool the milk therein.

It has been found that by this system, 54 gallons of milk may be cooled per hour from an udder temperature of 102° F. to a bulk tank temperature of 34° -38° F. This construction allows the farmer to cool substantially more milk at a faster rate and with greater efficiency.

The heat within the milk M will be transmitted via conduits 72 to the water W passing thereover, as represented by the arrow 68. The heated water will return to the cooling tank 12 via discharge outlet 70.

The heat within water W is extracted to the freon within the vertical coolant tube sections 31A, 31B, 33A and 33B via the fins 42. The compressor 28 returns the heated freon to the condenser 30 which again cools the freon and returns it to a solid liquid form. The liquid freon is then returned to evaporator inlet 32 where it expands and vaporizes to again extract heat to repeat the cooling cycle.

The milk cooled by cooling tubes 52 is supplied to the bulk tank 55 via a line 50A.

After the milking is completed, the valves 82 and 84 are operated to supply cleaning fluid from the cleaning fluid source 86 to the lines 50, 50A and 72. After the lines 50, 50A and 72 are cleaned, the valves 82 and 84 are again operated to connect the lines 50, 50A and 72 "in line" with the milker 52 and bulk tank 55.

The pump 47 is operated to force water W over the fins 42 in the direction of arrows 89 and 91. The longitudinal staggering U-shaped sections 31C and 33C and the spacing of fins 42 forces the water W to flow in a non-linear path but with sufficient velocity so as not to freeze.

This system function with a relatively low amount of cooling water W and can, if necessary, continually cool the milk from a 24 hour/day milking.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. In-line cooling apparatus for cooling liquids, such as milk, comprising:
   a cooler tank for containing cooling fluid;
   means for cooling said cooling fluid;
   conduit means for communicating a liquid, such as milk, to be cooled from a source to a storage tank or the like; and
   means for cooling the liquid in said conduit means including means for passing said cooling fluid over a portion of said conduit means to extract heat therefrom;
   said means for cooling said cooling fluid comprising:
   a compressor for compressing a refrigerant;
   a condenser coupled to said compressor for liquifying the compressed refrigerant; and
   an evaporator in said cooler tank for evaporating the liquified refrigerant and coupled to said compressor to return the evaporated refrigerant thereto, thereby cooling the cooling fluid in said tank;
   said evaporator comprising a serpentine tubing with a plurality of upstanding spaced apart tube sections coupled to adjacent ones of said tube sections and a plurality of vertically spaced apart, transversely extending, heat conductive cooling plates having aligned apertures receiving and being in intimate engagement with said tube sections.

2. The apparatus set forth in claim 1 wherein said plates are generally parallel and spaced apart at least one-quarter inch.

3. The apparatus set forth in claim 2 wherein said means for cooling said liquid includes a cooling chamber receiving a portion of said conduit means, and means for withdrawing said cooling fluid from said tank and passing it over said portion of said conduit means within said cooling chamber.

4. In-line cooling apparatus for cooling liquids, such as milk, comprising:
   a cooler tank for containing cooling fluid;
   means for cooling said cooling fluid;
   conduit means for communicating a liquid, such as milk, to be cooled from a source to a storage tank or the like; and
   means for cooling the liquid in said conduit means including means for passing said cooling fluid over a portion of said conduit means to extract heat therefrom;
   said means for cooling liquid comprising;
   an elongate tube having an inlet and an outlet in fluid communication with said tank;
   means for circulating fluid in said tank through said elongate tube from said inlet to said outlet and including a portion of said conduit means disposed within said elongate tube;
   said conduit means including a liquid carrying tube of a predetermined internal diameter; and
   said portion of said conduit means including a plurality of tubes having a lesser predetermined diameter;
   said elongate tube being mounted on said tank above the level of said cooling fluid;
   said elongate tube being closed at one end and including a passage therein snugly receiving said conduit means, the other end of said elongate tube including a drain opening allowing said fluid to be returned to said tank; and
   valve means coupled to said conduit means for decoupling said conduit means from said source and said tank and coupling same to a source of cleaning liquid, and means for selectively interrupting the flow of fluid from said tank to said elongate tube.

5. The apparatus set forth in claim 4 wherein said elongate tube is mounted on said tank above the level of said cooling fluid.

6. The apparatus set forth in claim 5 wherein said elongate tube is closed at one end and includes a passage therein snugly receiving said conduit means, the other end of said elongate tube including a drain opening allowing said fluid to be returned to said tank.

7. The apparatus set forth in claim 6 including valve means coupled to said conduit means for decoupling said conduit means from said source and said tank and coupling same to a source of cleaning liquid, and means for interrupting the flow of fluid from said tank to said elongate tube.

8. In-line cooling apparatus for cooling liquids, such as milk, comprising:
   a cooler tank for containing cooling fluid;
   means for cooling said cooling fluid;
   conduit means for communicating a liquid, such as milk, to be cooled from a source to a storage tank or the like; and
   means for cooling the liquid in said conduit means including means for passing said cooling fluid over a portion of said conduit means to extract heat therefrom;
   said means for cooling said cooling fluid comprising;
   a compressor for compressing a refrigerant;

a condenser coupled to said compressor for liquifying the compressed refrigerant; and an evaporator in said cooler tank for evaporating the liquified refrigerant and coupled to said compressor to return the evaporated refrigerant thereto, thereby cooling the cooling fluid in said tank;

said evaporator including a plurality of horizontally spaced apart, upstanding tube sections and generally U-shaped end tube sections coupling adjacent ends of adjacent tube sections in series relations, and a plurality of vertically spaced apart heat transfer plates each having a plurality of apertures receiving, in intimate engagement, said tube sections.

9. The apparatus set forth in claim 8 wherein said plates are vertically spaced from adjacent plates by at least one-quarter inch.

10. In-line cooling apparatus for cooling liquids, such as milk, comprising:

a cooler tank for containing cooling fluid;
means for cooling said cooling fluid;
conduit means for communicating a liquid, such as milk, to be cooled from a source to a storage tank or the like; and
means for cooling the liquid in said conduit means including means for passing said cooling fluid over a portion of said conduit means to extract heat therefrom;

said means for cooling said cooling fluid comprising;
a compressor for compressing a refrigerant;
a condenser coupled to said compressor for liquifying the compressed refrigerant; and
an evaporator in said cooler tank for evaporating the liquified refrigerant and coupled to said compressor to return the evaporated refrigerant thereto, thereby cooling the cooling fluid in said tank;

said evaporator comprising a plurality of longitudinal rows of vertical tube sections laterally aligned with the vertical tube sections in an adjacent row; the upper end of each vertical tube section in each row being coupled to an adjacent upper end of an adjacent vertical tube in the same row via a U-shaped tube section; the U-shaped tube sections in each row being longitudinally staggered relative to the U-shaped tube sections in a laterally adjacent row.

11. The apparatus set forth in claim 10 wherein the lower end of each vertical tube section in each row is coupled to the lower end of a laterally aligned, vertical tube section in an adjacent row via a U-shaped tube section.

* * * * *